United States Patent Office 3,045,412
Patented July 24, 1962

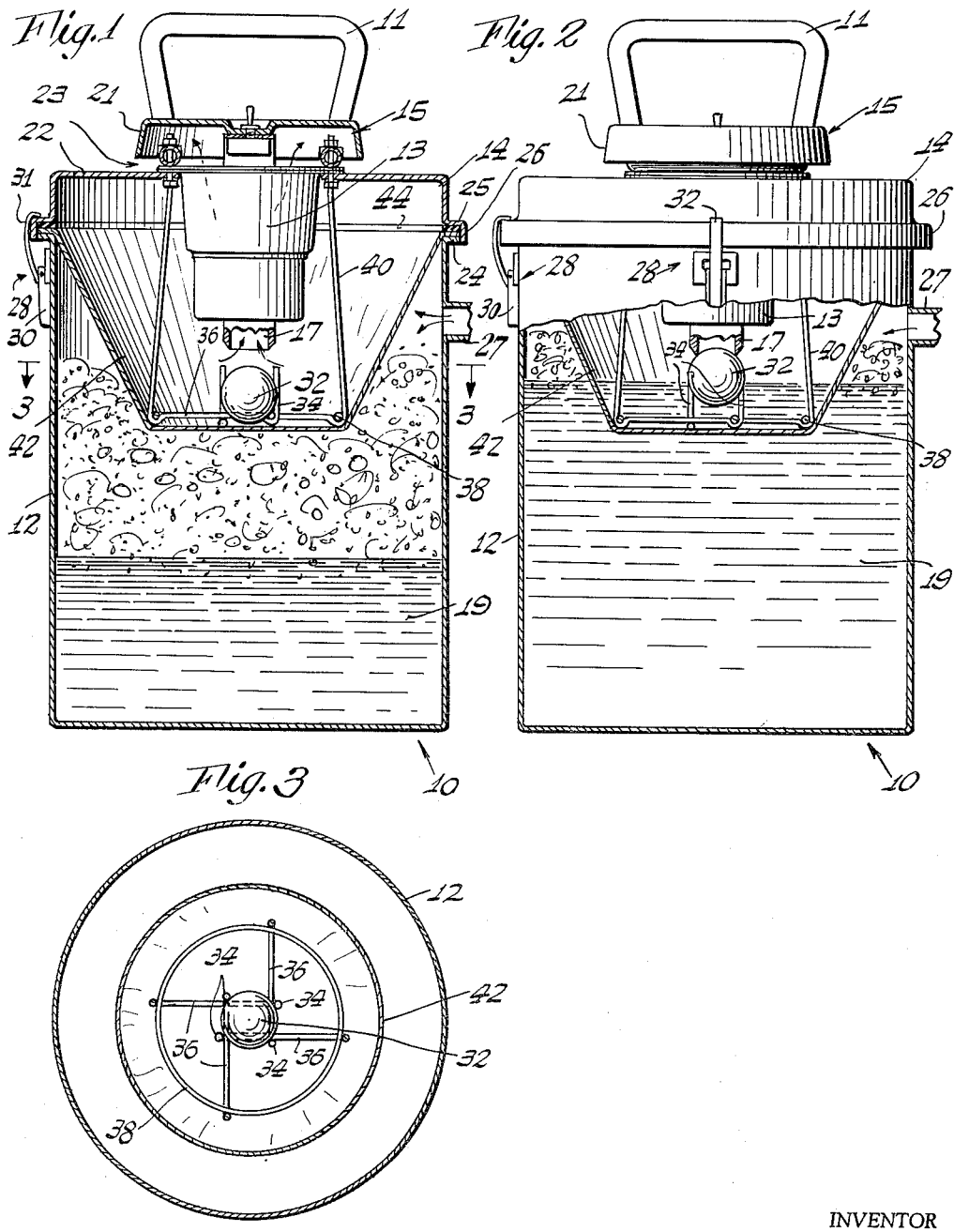

3,045,412
FLOAT SEAL FOR VACUUM CLEANERS
Gordon L. Bowman, St. Paul, Minn., assignor to Premier Company, St. Paul, Minn., a corporation of Minnesota
Filed Sept. 3, 1959, Ser. No. 837,815
1 Claim. (Cl. 55—417)

This invention relates to vacuum cleaners, and more particularly to tank-type cleaners, especially of the kind intended to be used for both wet and dry suction-type cleaning.

In the past various types of wet and dry tank-type vacuum cleaners have been proposed and produced. While these cleaners have in general operated satisfactorily they were subject to a number of drawbacks. For example, where the vacuum cleaner was to be used for rug shampooing or wet cleaning, it was often found that the suds and bubbles which were sucked into the tank, together with other foreign matter such as sawdust, chips, lint and the like would get in contact with the air-impeller and motor, adversely affecting the operation and condition of these. Further, where cleaners of the wet type were provided with float valves the suds, bubbles and other foreign matter would interfere with the proper, normal operation of the float valve, resulting in liquid and other matter coming in contact with air-impeller and/or the motor. This impaired the functioning of the vacuum cleaner, and might ultimately result in breakdown of the motor, air-impeller, bearings and the like.

The above disadvantages and drawbacks of prior wet or dry tank-type vacuum cleaners are obviated by the present invention, and one object of the invention is to provide a novel and improved tank-type vacuum cleaner suitable for wet or dry operation, wherein the float valve is positively kept out of contact with suds, bubbles, dirt, lint and other foreign matter and is instead truly responsive to the level of liquid in the tank, thereby to reliably shut off the vacuum which is manifested at the intake of the cleaner at such time that the tank becomes filled to its capacity.

Another object of the invention is to provide an improved wet or dry tank-type vacuum cleaner as above characterized, wherein a filter element is utilized in a unique manner to prevent the suds, foreign matter etc. from coming in contact with the float valve and impairing the normal operation thereof.

Still another object of the invention is to provide an improved tank-type vacuum cleaner in accordance with the foregoing, wherein the presence of the filter element in the tank is always required in order to enable the vacuum cleaner to be operative to produce a vacuum or suction at the intake means, thereby insuring that the cleaner will be inoperative without the filter element in place to protect the float valve.

An additional object of the invention is to provide an improved vacuum cleaner as above set forth and having the mentioned features and advantages, which is extremely simple in its construction, relatively small and compact, and which involves relatively few components and may be economically fabricated and produced.

Other features and advantages will hereinafter appear.

In the drawings accompanying this specification, similar characters of reference are used to designate like components throughout the several views, in which:

FIG. 1 is a vertical sectional view through a wet or dry tank-type vacuum cleaner as provided by the invention, the float valve being shown in its open position and the tank being shown as only partially filled with liquid.

FIG. 2 is a view similar to that of FIG. 1 but showing the upper portion of the tank in side elevation and illustrating the closed position of the float valve.

FIG. 3 is a transverse or horizontal sectional view taken on the line 3—3 of FIG. 1.

Referring now particularly to the drawings, the tank or canister of the vacuum cleaner is indicated generally by the numeral 10, said tank being provided at its top with an upwardly extending handle 11 and having in its upper portion an air-impeller and motor unit 13 discharging air as indicated by the arrows in FIG. 1 under a centrally disposed dished shield 15. The air-impeller and motor unit 13 has an intake means 17 at its bottom, the said intake means being in the form of a short tubular member which also constitutes a valve seat for a float valve device, as will be described later in detail.

The tank 10 may be advantageously constituted of two separable parts, a deep lower part 12 and a shallow upper part 14, the latter being in the form of an inverted dish and comprising a cover unit for a lower part 12 which forms the tank proper.

As seen in FIGS. 1 and 2, the tank part 12 has an intake means 27 constituted as a tubular fitting to which the vacuum cleaner hose may be secured and through which the dirt-laden air and/or suds and water laden air may be sucked from the rugs or other articles to be cleaned and brought into the tank part 12. The intake means 27 is shown as disposed in the upper portion of the tank part 12 whereby the tank may normally hold an appreciable quantity of liquid 19 when it is filled to its capacity as indicated in FIG. 2.

Preferably, as shown in FIG. 1, the air-impeller and motor unit 13 is mounted on the cover part 14 of the tank, as is also the outlet or discharge shield 15, the latter having a peripheral depending skirt 21 which is spaced from the upper surface 22 of the tank top 14, thereby to provide a discharge or vent means 23 for the air which is impelled by the unit 13.

The lower and upper tank parts 12 and 14 are made to be easily and quickly separable, and said parts have cooperable mating edges 24 and 25 in the form of outturned flanges, the upper flange 25 on the cover part 14 having a depending skirt 26 as shown.

For the purpose of securing together the upper and lower tank parts 14, 12 draft-type fasteners 28 are provided, preferably carried by the lower tank part 12. The fasteners 28 have pivoted operating arms 30 which carry draw links 31, the latter being adapted to engage the upper flange 25 and skirt 26 of the tank top 14 for the purpose of securing the top in place on the bottom part or tank 12.

In accordance with the present invention, a novel and improved float valve device and filter assemblage is provided within the tank 10, which is so arranged and constituted that the float valve device is kept out of contact with suds, bubbles, dirt, lint and other foreign matter which is brought into the tank 10 while at the same time enabling the device to be truly responsive to the level of liquid in the tank. Also, this is accomplished by a novel filter element organization which is secured in depending position within the tank 10, surrounding the float valve device, and is so arranged that the vacuum cleaner is rendered inoperative to produce a suction in the intake means 27 when the filter element is not positioned in the tank wherein it can protect the float valve device. Thus, the vacuum cleaner as provided by the present invention operates with the utmost reliability in protecting the air-impeller and motor unit 13 from contact with dirt, suds and the like and in insuring that the vacuum will be shut off from the intake means 27 at the time that the tank 12 is filled to its intended capacity.

As shown, the float valve device comprises a ball-shaped valve member 32 which is lighter than the liquid 19 whereby it will float upon the liquid surface, the valve member 32 being held in a cage constituted of four upright fingers 34 formed on arms 36 disposed in a horizontal plane and at their outer extremities connected together in the positions shown in FIG. 3 by a supporting ring element 38. The valve cage and arms 36, together with the ring 38 are supported on the top part 14 of the tank 10 by means of depending supports or struts 40 secured to the top 14, the said supports being preferably integral with the arms 36 and the latter in turn being preferably integral with the fingers 34. Thus, the ball valve member 32 is supported below the valve seat member 17 in an operative position as illustrated in FIGS. 1 and 2 and the said valve member may rise and descend as indicated in these figures, the raised position of the member closing the valve seat fitting 17 in response to the level of liquid 19 rising in the tank 10 to the full capacity of the latter. At any lower level of the said liquid, as for example that shown in FIG. 1, the valve member 32 has a rest position separated from the valve seat members 17, whereby the air-impeller and motor unit 13 may suck air from the tank 10 through the said fitting, to effect a vacuum in the tank for the purpose of drawing in the dirt- and suds-laden air through the intake means.

Surrounding the float valve device is a novel filter element 42 which is in the form of an inverted truncated cone, the large-diameter peripheral portion of the filter element 42 being interposed between the mating edges or flanges 24, 25 of the tank parts. The small-diameter peripheral portion of the filter element 42 is supported at a lower point in the tank, by means of the ring 38 which constitutes a portion of the float valve device supporting structure, as seen in FIGS. 1 and 2.

Preferably the large-diameter peripheral portion of the filter element 42 is provided with a resilient gasket or ring 44 which is also interposed between the mating edges 24, 25 and the organization is such that when the filter element 42 is in place within the tank 10 the fasteners 28 may securely pull the cover 14 tightly against the tank 12 so as to effect a secure, air-tight seal between the tank parts. However, if the filter element 42 and the gasket 44 carried thereby are omitted from the tank, the fasteners 28 can only loosely hold the tank top 14 and the leakage of air between the top 14 and the tank 12 is so great that no appreciable, working vacuum may be developed within the tank to enable the vacuum cleaner to be used for cleaning purposes. Accordingly, the absense of the filter element 42 in the tank 10 will prevent the use of the cleaner and protect the air impeller and motor unit 13, and prevent contamination and blocking of the float valve device comprising the valve member 32 and the valve seat fitting 17.

Thus it will now be readily understood that by the above construction the float valve device is protected by means of the filter 42 from suds, bubbles, dirt and other contaminating material, whereby it may reliably function in response to the rising level of the liquid 19 in the tank. The protected float valve device effectively safeguards the air-impeller and motor unit 13 and prevents contamination and malfunctioning of these. Moreover, the protection of the float valve device from suds and other dirt is insured by virtue of the filter construction which requires the filter to be properly placed in the tank in its operative position in order that the tank may be rendered air tight at the upper joint by the fasteners 28. If the filter is omitted, meaning that the float valve device is not protected from suds and the like, the vacuum cleaner may not be placed in use since insufficient vacuum is produced within the tank to enable any cleaning operations to be carried out.

It will be understood from the foregoing that the present improved vacuum cleaner is simple and reliable in its operation, is constituted of relatively few parts, and may be fabricated and produced at relatively low cost.

Variations and modifications may be made within the scope of the claim, and portions of the improvement may be used without others.

I claim:

In a wet-dry tank type vacuum cleaner, a tank having two separable parts of circular formation, said parts having cooperable peripheral mating edges in the form of out-turned flanges, an air impeller and motor unit connected with one of said tank parts and operable normally to create suction within the tank, said air impeller and motor unit having an intake means at its bottom which also constitutes a valve seat for a float valve device, and an outlet through an aperture formed in said one tank part, an intake means connected with the other tank part, a filter element disposed within the tank surrounding said float valve device, said filter element being in the shape of an inverted truncated cone with the large diameter being interposed between the mating flanges of the tank parts, and the smaller diameter peripheral portion of the filter element being supported at a lower point in the tank by a depending supporting means mounted on the said one-tank part, said supporting means having a detachable abutting engagement with said filter element so that it is separable therefrom when said tank parts are separated from each other, said filter element comprising a unitary structure formed with a sealing part that is interposed between the peripheral mating edges of the tank parts, draft type fasteners carried by the other of said tank parts, said fasteners being adapted to engage the out-turned flange of the one tank part for the purpose of securing the tank parts together, said large diameter peripheral portion of the filter element being provided with a resilient gasket which is also interposed between the mating edges of the tank parts and the organization being such that when the filter element is in place within the tank the fasteners may securely pull the cover tightly against the tank so as to effect an air-tight seal between the tank parts, whereas in the event the filter element and gasket carried thereby are omitted from the tank the fasteners can only loosely hold said one tank part and leakage of air between the tank parts results so that no appreciable working vacuum may be developed within the tank to enable the vacuum cleaner to be used for cleaning purposes.

References Cited in the file of this patent

UNITED STATES PATENTS

| | | |
|---|---|---|
| 1,249,692 | Upton et al. | Dec. 11, 1917 |
| 2,219,567 | Spielman | Oct. 29, 1940 |
| 2,242,278 | Yonkers | May 20, 1941 |
| 2,649,927 | Ortega | Aug. 25, 1953 |
| 2,656,009 | Kent | Oct. 20, 1953 |
| 2,703,152 | Petersen | Mar. 1, 1955 |
| 2,742,105 | Dow | Apr. 17, 1956 |
| 2,773,557 | Engberg | Dec. 11, 1956 |